United States Patent [19]

Morris

[11] Patent Number: 4,888,908

[45] Date of Patent: Dec. 26, 1989

[54] TANDEM BLADE SPINNER BAIT

[75] Inventor: John L. Morris, Springfield, Mo.

[73] Assignee: Bass Pro Shops, Inc., Springfield, Mo.

[21] Appl. No.: 332,365

[22] Filed: Mar. 30, 1989

Related U.S. Application Data

[63] Continuation of Ser. No. 172,789, Mar. 28, 1988, abandoned.

[51] Int. Cl.$^4$ .............................................. A01K 85/00
[52] U.S. Cl. ................................... 43/42.14; 43/42.19
[58] Field of Search ................. 43/42.2, 42.14, 42.19

[56] References Cited

U.S. PATENT DOCUMENTS

| | | | |
|---|---|---|---|
| 3,750,325 | 8/1973 | Feltman | 43/42.19 |
| 3,775,892 | 12/1973 | Bennetts | 43/42.2 |
| 4,033,065 | 7/1977 | Shannon | 43/42.14 |
| 4,625,448 | 2/1986 | Borders | 43/42.19 |
| 4,640,041 | 12/1987 | Stanley | 43/42.19 |

FOREIGN PATENT DOCUMENTS 467809  9/1950  Canada .................. 43/42.19

Primary Examiner—Nicholas P. Godici
Assistant Examiner—Michael William Starkweather

[57] ABSTRACT

A tandem blade spinner bait fishing lure. First and second spinner blades are coupled with a body portion of the lure by a V-shaped shank. A first swivel couples the first blade with one end of the shank. A blade bar couples the second blade with the first blade. A second swivel couples the second blade with the blade bar to allow independent rotation of the blades. The first swivel allows the blades to pivot about the end of the shank. The first and second blades freely rotate about an axis parallel to the path of travel of the lure through the water.

20 Claims, 1 Drawing Sheet

U.S. Patent    Dec. 26, 1989    4,888,908
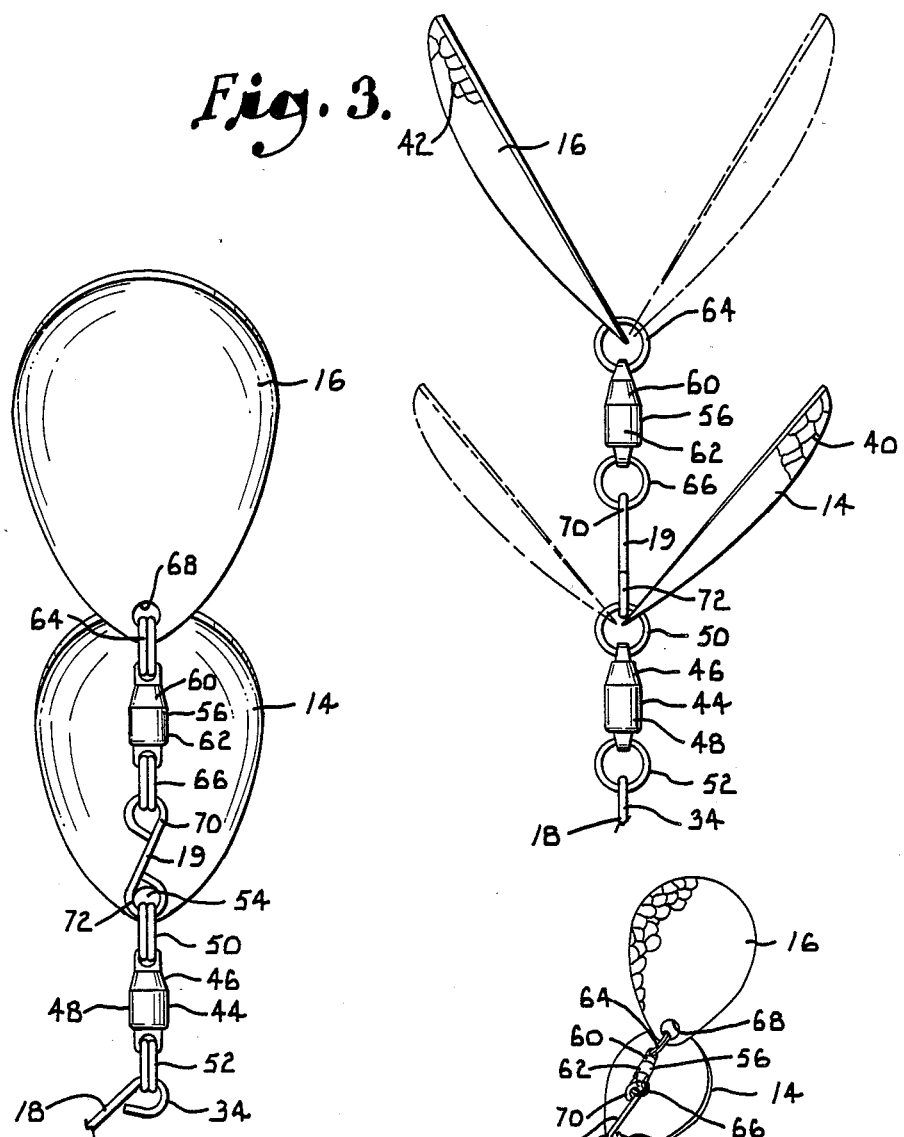
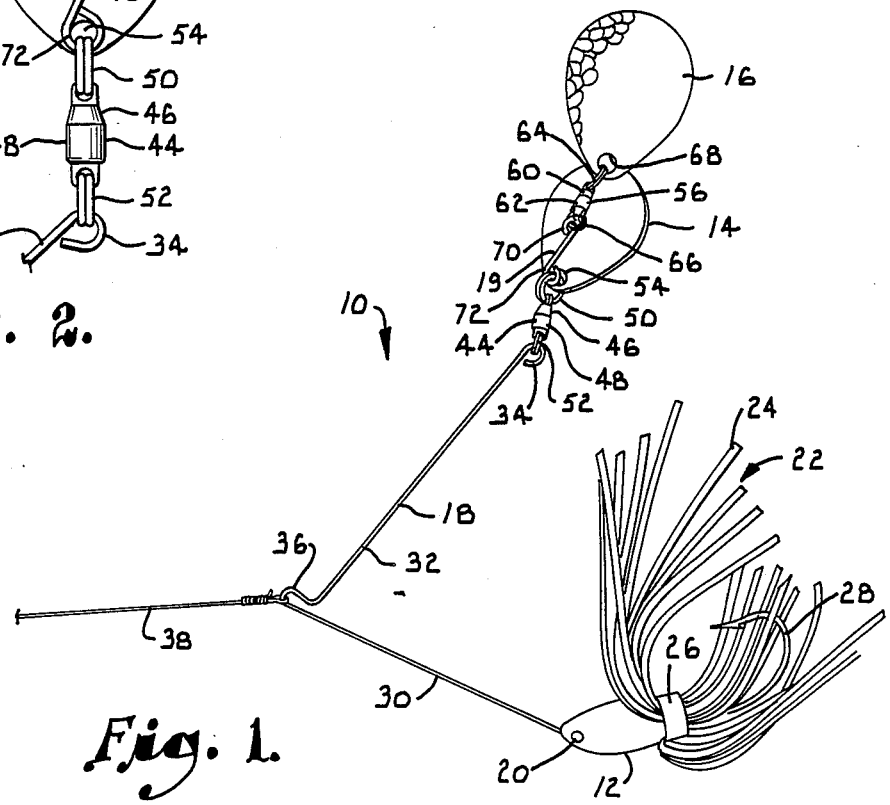

TANDEM BLADE SPINNER BAIT

This is a continuation of co-pending application Ser. No. 172,789, filed on Mar. 28, 1988, abandoned.

BACKGROUND OF THE INVENTION

This invention relates in general to fishing lures and more particularly to spinner bait lures.

While fishing, it is often desirable to let the fishing lure sink to a depth before the lure is reeled in. The lure may then be pulled along a substantially straight path or may be moved through a zig-zagging path with the lure repeatedly being pulled along an inclined path rising toward the surface and then being allowed to sink to the desired depth.

When used in this manner, conventional spinner lures do not produce the desired action along the entire path of travel of the lure. These lures utilize two variously shaped blades which are rotatably mounted onto a shaft of the lure. The blades rotate as the lure is pulled through the water and are designed to reflect light and create vibrations which attract fish strikes. While rotation of the tandum blades may be adequate when the lure is pulled through the water, the manner in which the blades are coupled to the lure shaft prevents the blades from freely rotating as the lure is allowed to sink. Thus, the lure only presents the desired target through a portion of its path of travel and the likelihood of a fish strike is greatly reduced.

SUMMARY OF THE INVENTION

It is an object of this invention to provide a spinner bait fishing lure with tandum blades which rotate as the lure sinks to a desired depth as well as when the lure is drawn through the water so that the lure presents the desired target along its entire path of travel through the water.

As a corollary to the previous object, it is another object of this invention to provide a spinner bait fishing lure having tandum blades which are coupled to the shaft or body portion of the lure in a manner which allows free rotation of both blades about a common axis as the lure sinks to the desired depth.

To accomplish these and other objects of the invention, a spinner bait fishing lure comprising a body portion and two or more blades is provided with a blade bar which couples the blades together. A swivel or other means couples one of the blades to the body portion and similar means may be used to couple the other blade with the blade bar. The blades are thus allowed to freely rotate about a common axis as the lure sinks to a depth as well as when the lure is drawn through the water.

BRIEF DESCRIPTION OF THE DRAWINGS

Referring now to the drawings which form a part of this specification and in which like reference numerals are used to indicate like parts in the various views:

FIG. 1 is a side elevational view of a spinner bait fishing lure of the present invention;

FIG. 2 is a fragmentary side elevational view of a blade bar coupling the tandum spinner blades; and FIG. 3 is a fragmentary side elevational view illustrating the rotation of the spinner blades resulting from movement of the lure through the water.

DESCRIPTION OF THE PREFERRED EMBODIMENT

Referring now to the drawings, a spinner bait fishing lure of the present invention is represented generally by the numeral 10. Lure 10 comprises a body portion 12 and tandum spinner blades 14 and 16, which are coupled to the body 12 by a generally V-shaped shank 18. A blade bar 19 couples blades 14 and 16.

Body portion 12 may comprise various shapes and sizes and is preferably weighted so that it is positioned below blades 14 and 16 when placed in the water. In the embodiment illustrated, body 12 includes an eye 20 and a skirt 22 formed from rubber or other suitably durable material. The skirt comprises a plurality of individual strands 24 which are coupled to the body 12 by a rubber band 26. A barbed hook 28 is coupled with a rear portion of body 12 and is concealed by skirt 22.

Shank 18 comprises a lower arm portion 30 and an upper arm portion 32. The upper arm portion 32 is formed into an eyelet 34 at its upper end. An eyelet 30 for coupling the lure 10 with a fishing line 38 is formed at the juncture of arm portions 30 and 32. The lower arm portion 30 is coupled with body 12 and extends forwardly and at an upward angle from a front portion of the body.

Blades 14 and 16 are generally spoon-shaped and, if desired, may have textured convex outer surfaces 40 and 42 respectively for reflecting light as the blades rotate. Blade 16 is slightly larger than blade 14, but the blades may be of various sizes and shapes to produce the desired action as the lure 10 moves through the water. Blade 14 is coupled with the upper end of shank 18 by a ball-bearing swivel 44. Swivel 44 comprises upper and lower portions 46 and 48 and circular rings 50 and 52 coupled with respective portions 46 and 48. Ring 50 is coupled with upper portion 46 and extends through a hole 54 in blade 14 and eyelet 55 in blade bar 19. Ring 52 is coupled with lower portion 48 and with shank eyelet 34.

A second swivel 56 and blade bar 19 couple spinner blade 16 with blade 14. Swivel 56 may be identical to swivel 44 and comprises upper and lower portions 60 and 62 and rings 64 and 66 which are coupled with portions 60 and 62. Upper ring 64 is coupled with a hole 68 in blade 16 and lower ring 66 is coupled with an eyelet 70 formed in one end of blade bar 19. A second eyelet formed in the other end of the blade bar couples the blade bar with ring 50 of first swivel 44.

Blade bar 58 may be formed from a single length of stainless steel or other material which is bent at both ends to form the generally circular eyelets 70 and 72. The ends are bent in opposite directions so that the bar 58 has a generally figure-8 shape. The bar may be of various lengths but is preferably of a length such that blade 14 slightly overlaps blade 16 when the blades are fully extended as shown in FIG. 2.

In use, swivels 44 and 56 and blade bar 58 allow the spinner blades 14 and 16 to rotate about a common axis as the lure sinks to a desired depth as well as when the lure is pulled through the water. When the lure 10 is cast into the water, the weighted body portion 12 sinks first with the blades 14 and 16 trailing above the body. As the lure descends through the water, the blades rotate, slowing the descent of the lure and reflecting light and creating vibrations which are designed to attract fish. When the lure 10 is reeled in, it moves forwardly through the water and blades 14 and 16 pivot about eyelet 34 while continuing their rotation.

The shank 18 is configured such that the blades 14 and 16 are spaced from and positioned directly above the front portion of body 12. This spacing prevents the body portion from impeding the rotation of the blades 14 and 16 when the lure is pulled through the water. Swivel 48 spaces the spinner blade 14 from the end of shank 18 and allows the blade to pivot about the shank end as the lure is moved through the water.

The use of swivel 48 to connect spinner blade 14 to shank 18 allows the spinner blade 14 to freely rotate throughout the entire path of travel of the lure 10. The axis of rotation of the blade pivots about eyelet 34 and remains substantially parallel to the path of travel of lure 10 through the water. Blade bar 19 spaces blade 16 from blade 14 and allows it to rotate unimpeded by blade 14. By directly coupling the blades 14 and 16 along a common axis using blade bar 19 and swivel 56, the blades are allowed to rotate about the same axis.

Swivel 56 allows the blade 16 to turn independently of blade 14. Thus, both of the blades may turn freely and produce the desired action regardless of the path of travel of the lure 10 through the water. This is particularly desirable as the lure then presents a target substantially the entire time that it is in the water rather than merely as it is pulled through the water.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A spinner bait fishing lure comprising:
   a body portion;
   a hook coupled with said body portion;
   first and second spinner blades;
   a shank extending from said body portion;
   first means pivotally coupling said first spinner blade with said shank and allowing rotation of said blade; and
   second means coupling said second spinner blade with said first spinner blade and allowing rotation of said second spinner blade about a common axis with said first spinner blade as said lure is allowed to sink to a depth in a body of water as well as when said lure is pulled through said body of water.

2. The invention of claim 1, wherein said first means comprises a swivel coupling said first blade with an end of said shank.

3. The invention of claim 2, wherein said shank comprises a lower arm portion and an upper arm portion.

4. The invention of claim 3, wherein said lower arm portion is coupled with a front portion of said body portion and extends forwardly and at an upward angle from said body portion.

5. The invention of claim 4, including an eyelet at a juncture of said upper and lower arm portions for coupling with a fishing line.

6. The invention of claim 5, wherein said shank comprises a generally V-shape.

7. The invention of claim 1, wherein said second means comprises a blade bar coupled at one end with said first spinner blade and at the other end with said second spinner blade.

8. The invention of claim 7, wherein said first means comprises a swivel coupling said first blade with an end of said shank and wherein said blade bar is coupled at said one end with said swivel.

9. The invention of claim 8, wherein said second means further comprises a second swivel coupling said second spinner blade with said other end of said blade bar to allow independent rotation of said spinner blades.

10. A spinner bait fishing lure comprising:
    a body portion;
    a hook coupled with said body portion;
    a shank coupled with said body portion;
    first and second spinner blades coupled with said shank;
    a swivel pivotally coupling said first spinner blade with said shank, wherein said swivel allows rotation of said first blade about an axis substantially parallel to the path of travel of said lure through a body of water; and
    a blade bar coupling said second blade with said first swivel and spacing said first spinner blade from said second spinner blade,
    whereby said blades are rotatable about said axis when said lure is allowed to sink to a depth in said body of water as well as when said lure is pulled through said body of water.

11. The invention of claim 10, including a second swivel coupling said second spinner blade with said blade bar to allow independent rotation of said blades.

12. The invention of claim 11, wherein said second swivel is coupled at one end with said second spinner blade and at the other end with said blade bar.

13. The invention of claim 10, wherein said shank is generally V-shaped and comprises a lower arm portion and an upper arm portion, wherein said lower arm portion is coupled with and extends forwardly from said body portion.

14. The invention of claim 13, including an eyelet at a juncture of said upper and lower arm portions for coupling with a fishing line.

15. A spinner bait fishing lure comprising:
    a body portion;
    a hook coupled with said body portion;
    a generally V-shaped shank coupled with said body portion at one end and having an eyelet at the other end;
    a first spinner blade coupled with said shank eyelet by a first swivel, wherein said first swivel allows said blade to pivot about said other end of the shank and rotate about an axis substantially parallel to the path of travel of the lure through a body of water;
    a second spinner blade; and
    a blade bar having one end coupled with said first swivel and an other end coupled with said second spinner blade to allow said second spinner blade to rotate about said axis.

16. The invention of claim 15, including a second swivel coupling said second spinner blade with said other end of the blade bar to allow independent rotation of said first and second spinner blades about said axis.

17. A spinner bait fishing lure comprising:
 a body portion;
 a hook coupled with said body portion;
 a shank extending from said body portion;
 a blade bar means pivotally coupling said blade bar with said shank and allowing rotation of said blade bar about an axis, said axis being generally parallel to the path of travel of said lure; and
 a spinner blade coupled with said blade bar and rotatable independently thereof.

18. The invention of claim 17, wherein said spinner blade is coupled with an end of said blade bar.

19. The invention of claim 18, including a swivel coupling said spinner blade with the end of said blade bar.

20. The invention of claim 19, including a second spinner blade coupled with the other end of the blade bar.

* * * * *